(12) United States Patent
Xu

(10) Patent No.: US 11,119,464 B2
(45) Date of Patent: Sep. 14, 2021

(54) CONTROLLER AND MACHINE LEARNING DEVICE

(71) Applicant: FANUC CORPORATION, Yamanashi (JP)

(72) Inventor: Yuanming Xu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 225 days.

(21) Appl. No.: 15/983,374

(22) Filed: May 18, 2018

(65) Prior Publication Data

US 2018/0341244 A1 Nov. 29, 2018

(30) Foreign Application Priority Data

May 26, 2017 (JP) .............................. JP2017-105069

(51) Int. Cl.
*G05B 19/401* (2006.01)
*G06N 20/00* (2019.01)
(Continued)

(52) U.S. Cl.
CPC ....... *G05B 19/401* (2013.01); *G05B 13/0265* (2013.01); *G05B 19/4163* (2013.01);
(Continued)

(58) Field of Classification Search
CPC .............. G05B 13/0265; G05B 19/401; G05B 19/4163; G05B 2219/37355;
(Continued)

(56) References Cited

U.S. PATENT DOCUMENTS 5,044,125 A * 9/1991 Lambert, Jr. ........... B24B 49/16
451/27
6,177,774 B1 * 1/2001 Iwashita .............. H02H 7/0838
318/434
(Continued)

FOREIGN PATENT DOCUMENTS

JP 6219347 A 1/1987
JP 2000-84794 A 3/2000
(Continued)

OTHER PUBLICATIONS

Japan Patent 2000084794, Mar. 28, 2000, Inoue Shinichi.*
(Continued)

*Primary Examiner* — Li B. Zhen
*Assistant Examiner* — Peter D Coughlan
(74) *Attorney, Agent, or Firm* — RatnerPrestia

(57) ABSTRACT

A machine learning device of a controller observes, as state variables that express a current state of an environment, feeding amount data indicating a feeding amount per unit cycle of a tool and vibration amount data indicating a vibration amount of a cutting part of the tool when the cutting part of the tool passes through the workpiece. In addition, the machine learning device acquires determination data indicating a propriety determination result of the vibration amount of the cutting part of the tool when the cutting part of the tool passes through the workpiece. Then, the machine learning device learns the feeding amount per unit cycle of the tool when the cutting part of the tool passes through the workpiece in association with the vibration amount data, using the state variables and the determination data.

11 Claims, 10 Drawing Sheets

(51) Int. Cl.
*G05B 19/416* (2006.01)
*G05B 13/02* (2006.01)
*G06N 3/08* (2006.01)
*G06N 3/00* (2006.01)

(52) U.S. Cl.
CPC ............ *G06N 3/006* (2013.01); *G06N 3/08* (2013.01); *G06N 20/00* (2019.01); *G05B 2219/37355* (2013.01); *G05B 2219/49065* (2013.01)

(58) Field of Classification Search
CPC .... G05B 2219/49065; G05B 19/40932; G05B 19/40937; G05B 2219/35168; G05B 2219/36289; G05B 2219/36321; G05B 19/4065; B23C 2250/16; B23Q 11/0039; B23Q 15/013; B23Q 15/08; B23Q 17/12; B23Q 15/00; B23Q 15/12; B23Q 17/0961; B29Q 17/0985
See application file for complete search history.

(56) References Cited

U.S. PATENT DOCUMENTS

| | | | | |
|---|---|---|---|---|
| 6,438,445 | B1* | 8/2002 | Yoshida | G05B 19/40937 700/173 |
| 6,535,788 | B1* | 3/2003 | Yoshida | G05B 19/40931 700/191 |
| 7,269,471 | B2* | 9/2007 | Kadono | G05B 19/4097 345/419 |
| 7,933,679 | B1* | 4/2011 | Kulkarni | G05B 13/0265 700/173 |
| 2011/0222980 | A1* | 9/2011 | Kuo | B23Q 17/12 409/80 |
| 2011/0301742 | A1* | 12/2011 | Mundt | G05B 19/186 700/173 |
| 2015/0142753 | A1* | 5/2015 | Soon-Shiong | G06F 16/78 707/673 |
| 2015/0168938 | A1* | 6/2015 | Fujimoto | G05B 19/4163 700/160 |
| 2016/0161936 | A1* | 6/2016 | Lee | G05B 19/182 700/173 |

FOREIGN PATENT DOCUMENTS

| | | |
|---|---|---|
| JP | 2017030067 A | 2/2017 |
| JP | 2017045300 A | 3/2017 |

OTHER PUBLICATIONS

'Elements of artificial neural networks': Mehrotra, 1997, MIT press.*

Notification of Reasons for Refusal dated Jan. 29, 2019 with translation, 6 pages.

* cited by examiner

CONTROLLER AND MACHINE LEARNING DEVICE

CROSS-REFERENCE TO RELATED APPLICATION

This application is a new U.S. Patent Application that claims benefit of Japanese Patent Application No. 2017-105069, filed May 26, 2017, the disclosure of this application is being incorporated herein by reference in its entirety for all purposes.

BACKGROUND OF THE INVENTION

1. Field of the Invention

The present invention relates to a controller and a machine learning device and, in particular, to a controller that prevents vibrations at the completion of cutting and a machine learning device.

2. Description of the Related Art

When crosscut grooving is performed by a machine tool using an end mill, a cutting load is applied to a tool 5 when cutting a workpiece 6, which results in the occurrence of deflection in the cutting part of the tool 5 as shown in FIG. 9 (see Japanese Patent Application Laid-open No. 2000-084794).

FIGS. 10A and 10B are diagrams showing a state in which crosscut grooving is performed by an end mill.

In the crosscut grooving, a cutting load is applied to the cutting part of a tool 5 in a direction opposite to the feeding direction of the tool 5 when a workpiece 6 is machined. Due to the cutting load, the cutting part of the tool 5 is deflected as shown in FIG. 10B (side view). The cutting load applied to the cutting part of the tool 5 rapidly reduces at a point at which the cutting work of the workpiece 6 is completed, i.e., at a moment at which the tool 5 reaches the end of the workpiece 6 and the cutting part of the tool 5 exits the workpiece 6. At the same time, deflection occurring in the cutting part of the tool 5 is rapidly restored. However, the cutting part of the tool 5 vibrates as its deflection is restored.

Vibrations occurring in the cutting part of a tool as described above have a considerable influence on the quality of a machined surface at the end of a workpiece, or in some cases could result in reduction in the accuracy of the machining shape of the workpiece and the shortening of the life of a cutting tool. In addition, excessive vibrations could result in the breakdown of a machine.

As conventional countermeasures against such problems, vibrations occurring when the cutting part of a tool exits a workpiece are not taken into consideration or a small feeding amount (low feeding speed) per unit cycle when the cutting part of the tool exits the workpiece is specified by a program to prevent a rapid change in the deflection of the cutting part of the tool.

However, the extent of a feeding amount (feeding speed) per unit cycle at which a rapid change in the deflection of the cutting part of a tool may be prevented is different depending on material of a workpiece, a type of a tool, rigidity of a tool and a machine, or the like. In addition, since the adjustment of a small feeding amount (low feeding speed) per unit cycle results in an increase in cycle time, it is not preferable to set an excessively small feeding amount (low feeding speed). Therefore, an inexperienced operator takes a long time to find an optimum feeding amount (feeding speed) per unit cycle.

SUMMARY OF THE INVENTION

In view of the above problem, the present invention has an object of providing a controller and a machine learning device capable of preventing vibrations occurring in a cutting part when the cutting part of a tool passes through a workpiece in crosscut grooving.

A controller according to an embodiment of the present invention determines a feeding amount per unit cycle of a tool when a cutting part of the tool passes through a workpiece in crosscut grooving. The controller includes a machine learning device that learns the feeding amount per unit cycle of the tool when the cutting part of the tool passes through the workpiece. The machine learning device includes a state observation section that observes, as state variables that express a current state of an environment, feeding amount data indicating the feeding amount per unit cycle of the tool when the cutting part of the tool passes through the workpiece, and vibration amount data indicating a vibration amount of the cutting part of the tool when the cutting part of the tool passes through the workpiece, a determination data acquisition section that acquires determination data indicating a propriety determination result of the vibration amount of the cutting part of the tool when the cutting part of the tool passes through the workpiece, and a learning section that learns the feeding amount per unit cycle of the tool when the cutting part of the tool passes through the workpiece in association with the vibration amount data, using the state variables and the determination data.

The state observation section may further observe, as the state variable, at least any of tool data indicating information on the tool, workpiece data indicating information on the workpiece, machining shape data indicating information on a machining shape, and machine data indicating information on a machine, and the learning section may learn the data observed by the state observation section in association with the vibration amount data.

The determination data may include a propriety determination result of cycle time for the crosscut grooving, besides the propriety determination result of the vibration amount of the cutting part of the tool.

The learning section may include a reward calculation section that calculates a reward relating to the propriety determination result, and a value function update section that updates, using the reward, a function that expresses a value of the feeding amount per unit cycle of the tool when the cutting part of the tool passes through the workpiece, with respect to the vibration amount of the cutting part of the tool when the cutting part of the tool passes through the workpiece.

The learning section may calculate the state variables and the determination data in a multilayer structure.

The controller may further include a decision-making section that outputs a command value based on the feeding amount per unit cycle of the tool when the cutting part of the tool passes through the workpiece, according to a learning result of the learning section.

The state observation section may further observe main-spindle rotation-speed data indicating the rotation speed of a main spindle as the state variable, and the learning section may learn the data observed by the state observation section in association with the vibration amount data.

The decision-making section may output a command value based on the rotation speed of the main spindle when the cutting part of the tool passes through the workpiece.

The learning section may learn the feeding amount per unit cycle of the tool when the cutting part of the tool passes through the workpiece in each of a plurality of machine tools, using the state variables and the determination data obtained for each of the plurality of machine tools.

The machine learning device may exist in a cloud server.

A machine learning device according to another embodiment of the present invention learns a feeding amount per unit cycle of a tool when a cutting part of the tool passes through a workpiece in crosscut grooving. The machine learning device includes: a state observation section that observes, as state variables that express a current state of an environment, feeding amount data indicating the feeding amount per unit cycle of the tool when the cutting part of the tool passes through the workpiece, and vibration amount data indicating a vibration amount of the cutting part of the tool when the cutting part of the tool passes through the workpiece; a determination data acquisition section that acquires determination data indicating a propriety determination result of the vibration amount of the cutting part of the tool when the cutting part of the tool passes through the workpiece; and a learning section that learns the feeding amount per unit cycle of the tool when the cutting part of the tool passes through the workpiece in association with the vibration amount data, using the state variables and the determination data.

According to an embodiment of the present invention, it is possible to determine a feeding amount (feeding speed) per unit cycle of a tool when the cutting part of the tool passes through a workpiece based on a learning result to prevent vibrations occurring in the cutting part when the cutting part of the tool passes through the workpiece in crosscut grooving.

DETAILED DESCRIPTION OF THE PREFERRED EMBODIMENTS

Figure 1:
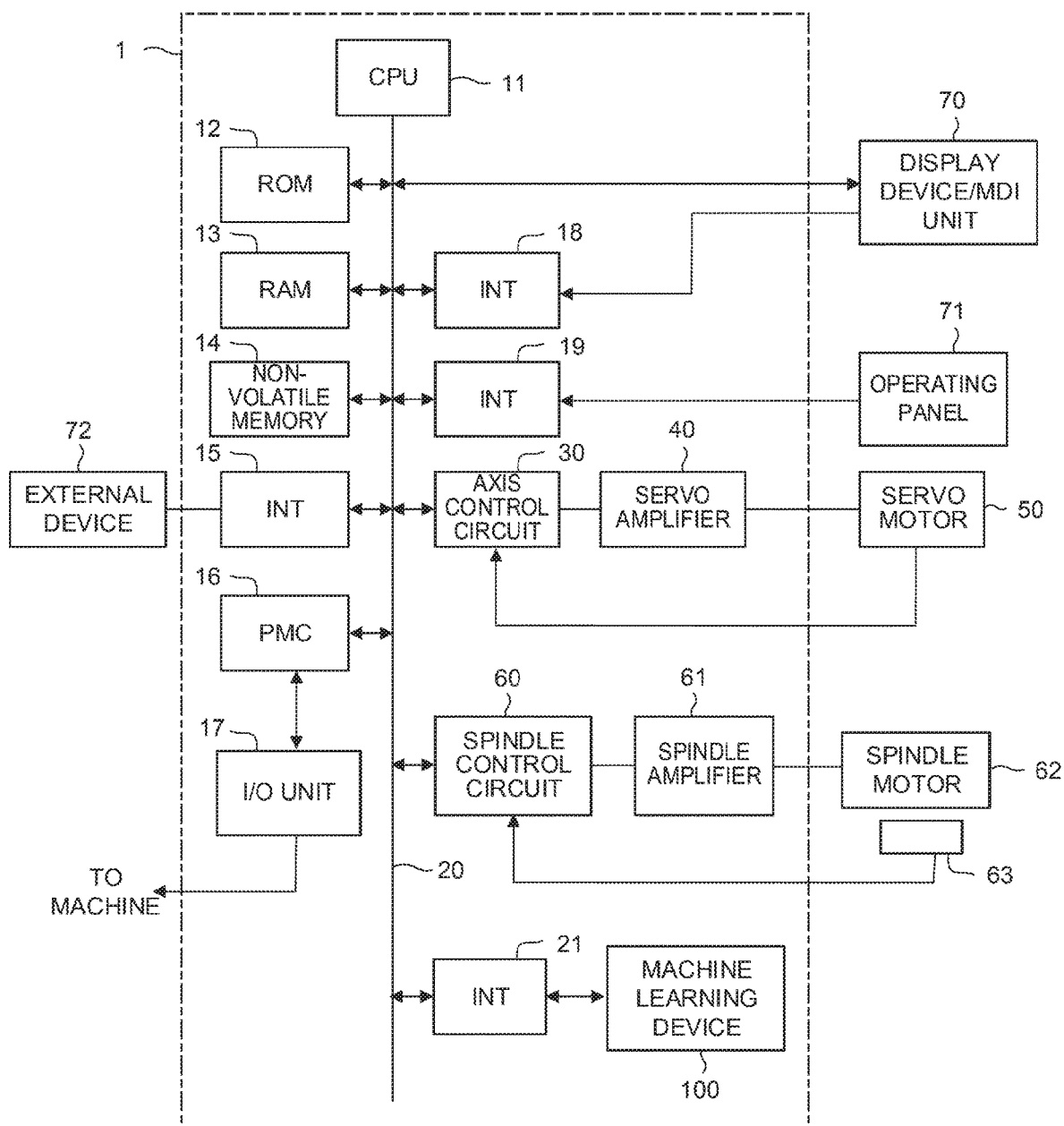
FIG. 1 is a schematic hardware configuration diagram of a controller according to a first embodiment of the present invention.

FIG. 1 is a schematic hardware configuration diagram showing a controller 1 and the essential parts of a machine tool controlled by the controller according to a first embodiment.

The controller 1 of the embodiment may be mounted as, for example, a numerical controller for controlling a machine tool (not shown) that performs crosscut grooving. A central processing unit (CPU) 11 of the controller 1 according to the embodiment is a processor that entirely controls the controller 1. The CPU 11 reads a system program stored in a read-only memory (ROM) 12 via a bus 20 and controls the entire controller 1 according to the system program. A random access memory (RAM) 13 stores temporary calculation data or display data and various data or the like input by an operator via a display device/MDI unit 70 that will be described later.

A non-volatile memory 14 is constituted as a memory that maintains its storage state by, for example, data backup or the like with a battery (not shown) even if the power of the controller 1 is turned off. The non-volatile memory 14 stores a machining program read via an interface 15, a machining program input via the display device/MDI unit 70 that will be described later, or the like. The non-volatile memory 14 further stores an operation processing program or the like for operating a machining program, but the programs are developed into the RAM 13 when executing such programs. Further, the ROM 12 stores in advance various system programs (including system programs for controlling communication with a machine learning device 100 that will be described later) for running the processing of an editing mode necessary for creating and editing a machining program or the like.

An interface 15 is an interface for connection with the controller 1 and an external device 72 such as an adapter. A machining program, various parameters, or the like is read from the external device 72. Further, a machining program edited in the controller 1 may be stored in external storage means via the external device 72. A programmable machine controller (PMC) 16 outputs via an input/output (I/O) unit 17 a signal to a peripheral apparatus (for example, an actuator such as a robot hand for tool exchange) of a machine tool according to a sequence program included in the controller 1 and controls the same. Further, the PMC 16 performs necessary signal processing on signals after receiving the signals from various switches or the like of an operating panel disposed in the body of a machine tool, and then supplies the signals to the CPU 11.

The display device/MDI unit 70 is a manual data input device including a display, a keyboard, or the like, and an interface 18 supplies commands and data to the CPU 11 after receiving the same from the keyboard of the display device/MDI unit 70. An interface 19 is connected to an operating panel 71 including a manual pulse generation device or the like used for manually driving respective axes.

An axis control circuit 30 for controlling the axes of a machine tool receives movement command amounts of the axes from the CPU 11 and outputs a command for moving the axes to a servo amplifier 40. After receiving the command, the servo amplifier 40 drives a servo motor 50 that moves the correspond axis of the machine tool. The servo motor 50 for each of the axes includes a position/speed detection device and feeds back position/speed feedback signals from the position/speed detection device to the axis control circuit 30 to perform position/speed feedback control. Note that the axis control circuit 30, the servo amplifier 40, and the servo motor 50 are singly shown in the hardware configuration diagram of FIG. 1 but actually provided corresponding to the number of axes of a machine tool to be controlled. For example, in the case of a machine tool including three linear axes, the axis control circuit 30, the servo amplifier 40, and the servo motor 50 are provided for each of an X-axis, a Y-axis, and a Z-axis representing the linear axes.

A spindle control circuit 60 receives a main spindle rotation command for a machine tool and outputs a spindle speed signal to a spindle amplifier 61. After receiving the spindle speed signal, the spindle amplifier 61 rotates a spindle motor 62 of the machine tool at a commanded rotation speed to drive a tool. The spindle motor 62 is connected to a position detection device 63. The position detection device 63 outputs a feedback pulse in synchronization with the rotation of a main spindle, and the feedback pulse is read by the CPU 11.

An interface 21 is an interface for connecting the controller 1 and the machine learning device 100 to each other. The machine learning device 100 may observe respective information (such as values of respective signals acquired via the PMC 16, current values of the servo motor 50 and the spindle motor 62, and a running machining program and setting information on a tool stored in the RAM 13 or the like) capable of being acquired by the controller 1 via the interface 21. Further, after receiving commands for controlling the servo motor 50, the spindle motor 62, and the peripheral device of a machine tool, output from the machine learning device 100, the controller 1 performs correction or the like of a command for controlling the machine tool based on a machining program.

Figure 2:
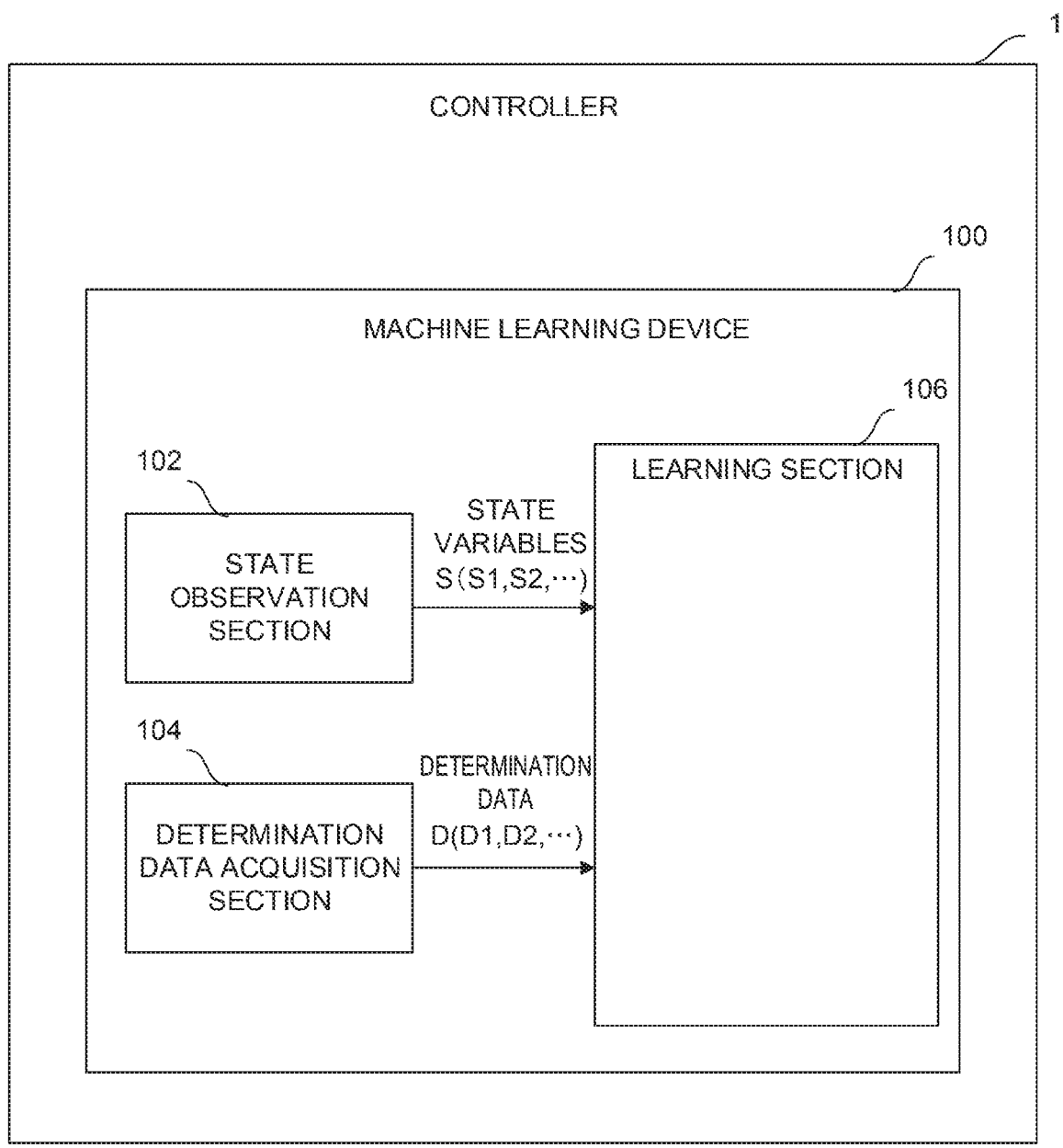
FIG. 2 is a schematic function block diagram of the controller according to the first embodiment of the present invention.

FIG. 2 is a schematic function block diagram of the controller 1 and the machine learning device 100 according to the first embodiment.

The machine learning device 100 includes software (such as a learning algorithm) and hardware (such as the CPU of a computer) for spontaneously learning a feeding amount (feeding speed) per unit cycle of a tool with respect to a vibration amount of the cutting part of the tool when the cutting part of the tool passes through a workpiece in crosscut grooving through so-called machine learning. An object to be learned by the machine learning device 100 of the controller 1 corresponds to a model structure that expresses the correlation between a vibration amount of the cutting part of a tool and a feeding amount (feeding speed) per unit cycle of the tool when the cutting part of the tool passes through a workpiece in crosscut grooving.

As shown in the function block of FIG. 2, the machine learning device 100 of the controller 1 includes a state observation section 102, a determination data acquisition section 104, and a learning section 106. The state observation section 102 observes state variables S expressing the current state of an environment, which include feeding amount data S1 indicating a feeding amount (feeding speed) per unit cycle of a tool when the cutting part of the tool passes through a workpiece in crosscut grooving and vibration amount data S2 indicating a vibration amount of the cutting part of the tool when the cutting part of the tool passes through the workpiece in the crosscut grooving. The determination data acquisition section 104 acquires determination data D indicating a propriety determination result of the vibration amount of the cutting part of the tool when the cutting part of the tool passes through the workpiece in the crosscut grooving under the set feeding amount (feeding speed) per unit cycle of the tool. Using the state variables S and the determination data D, the learning section 106 learns the vibration amount of the cutting part of the tool and the feeding amount data S1 in association with each other.

The state observation section 102 may be configured as, for example, one of the functions of the CPU of a computer or software for functioning the CPU of the computer. Among the state variables S observed by the state observation section 102, the feeding amount data S1 may be acquired from, for example, a feeding amount of a machining program reported by a skilled worker and given to the controller 1. Further, as the feeding amount data S1, the machine learning device 100 may use a feeding amount (feeding speed) per unit cycle of a tool determined in the previous learning cycle based on learning results of the learning section 106 when learning is advanced to a certain extent. In such a case, the machine learning device 100 may temporarily store in advance a determined feeding amount (feeding speed) per unit cycle of a tool in an internal memory for each of learning cycles so that the state observation section 102 acquires from the memory a feeding amount (feeding speed) per unit cycle of the tool determined by the machine learning device 100 in the previous learning cycle.

In addition, as the vibration amount data S2 among the state variables S, a value indirectly calculated from the fluctuation or the like of the value of a current flowing through the servo motor 50 when the cutting part of a tool passes through a workpiece may be, for example, used. The vibration amount data S2 may be directly calculated using an acceleration sensor included in the main spindle of a machine tool or may be directly calculated based on an image taken by imaging means attached to the machine tool. Moreover, a machined part of a workpiece may be measured by a distance sensor, imaging means, or the like after the completion of machining so that a vibration amount is indirectly calculated based on the roughness of a machined surface specified according to the measurement results.

The determination data acquisition section 104 may be configured as, for example, one of the functions of the CPU of a computer or software for functioning the CPU of the computer. As the determination data D, the determination data acquisition section 104 may use propriety determination values D1 with respect to a vibration amount of the cutting part of a tool when the cutting part of the tool passes through a workpiece in crosscut grooving. Using the same means as that used when the state observation section 102 observes the vibration amount data S2, the determination data acquisition section 104 may acquire a vibration amount of the cutting part of a tool when the cutting part of the tool passes through a workpiece in crosscut grooving. The determination data D is an index that expresses a result obtained when crosscut grooving is performed under the state variables S.

In terms of the learning cycle of the learning section 106, the state variables S simultaneously input to the learning section 106 are those based on data in the previous learning cycle at which the determination data D has been acquired. As described above, while the machine learning device 100 of the controller 1 advances machine learning, the acquisition of the vibration amount data S2, the implementation of crosscut grooving based on the feeding amount data S1, and the acquisition of the determination data D are repeatedly performed in an environment.

The learning section 106 may be configured as, for example, one of the functions of the CPU of a computer or software for functioning the CPU of the computer. According to any learning algorithm collectively called machine learning, the learning section 106 learns the feeding amount data S1 with respect to a vibration amount of the cutting part of a tool. The learning section 106 may repeatedly perform learning based on a data set including the above state variables S and the determination data D. When the cycle of learning the feeding amount data S1 with respect to a vibration amount of the cutting part of a tool is repeatedly performed, a vibration amount of the cutting part of the tool when the cutting part of the tool passes through a workpiece in crosscut grooving acquired in the previous learning cycle as described above is used as the vibration amount data S2 among the state variables S. As the feeding amount data S1, a feeding amount (feeding speed) per unit cycle of the tool when the cutting part of the tool passes through the workpiece in the crosscut grooving obtained until the previous learning result is used. As the determination data D, a propriety determination result of a vibration amount of the cutting part of the tool in a current learning cycle in a state in which settings based on the feeding amount data S1 have been made are used.

By repeatedly performing such a learning cycle, the learning section 106 may automatically identify a feature suggesting the correlation between a vibration amount (vibration amount data S2) of the cutting part of a tool and a feeding amount (feeding speed) per unit cycle of the tool when the cutting part of the tool passes through a workpiece in crosscut grooving.

Although the correlation between the vibration amount data S2 and a feeding amount (feeding speed) per unit cycle of a tool is substantially unknown at the start of a learning algorithm, the learning section 106 gradually identifies a feature indicating the correlation and interprets the correlation as learning is advanced. When the correlation between the vibration amount data S2 and a feeding amount (feeding speed) per unit cycle of a tool is interpreted to a certain reliable extent, learning results repeatedly output by the learning section 106 may be used to select the action (that is, decision making) of determining to what extent a feeding amount (feeding speed) per unit cycle of the tool is adjusted when the cutting part of the tool passes through a workpiece, with respect to a current state (that is, a vibration amount of the cutting part of the tool when the cutting part of the tool passes through the workpiece in crosscut grooving). That is, as a learning algorithm is advanced, the learning section 106 may gradually approximate the correlation between a vibration amount of the cutting part of a tool when the cutting part of the tool passes through a workpiece in crosscut grooving and the action of determining to what extent a feeding amount (feeding speed) per unit cycle of the tool is adjusted when the cutting part of the tool passes through the workpiece, with respect to a current state to an optimum solution.

As described above, in the machine learning device 100 of the controller 1, the learning section 106 learns a feeding amount (feeding speed) per unit cycle of a tool according to a machine learning algorithm using the state variables S observed by the state observation section 102 and the determination data D acquired by the determination data acquisition section 104. The state variables S are composed of the feeding amount data S1 and the vibration amount data S2 hardly influenced by disturbance. In addition, the determination data D is uniquely calculated by the acquisition of the current values of the servo motor 50 actually measured by the controller 1 or the like. Accordingly, using learning results of the learning section 106, the machine learning device 100 of the controller 1 may automatically and accurately calculate a feeding amount (feeding speed) per unit cycle of a tool when the cutting part of the tool passes through a workpiece according to a vibration amount of the cutting part of the tool when the cutting part of the tool passes through the workpiece in crosscut grooving without relying on calculation or estimation.

Where it is possible to automatically calculate a feeding amount (feeding speed) per unit cycle of a tool when the cutting part of the tool passes through a workpiece in crosscut grooving without relying on calculation or estimation, an appropriate value of the feeding amount (feeding speed) per unit cycle of the tool when the cutting part of the tool passes through the workpiece may be quickly determined only by understanding a vibration amount (vibration amount data S2) of the cutting part of the tool when the cutting part of the tool passes through the workpiece in the crosscut grooving. Accordingly, the determination of a feeding amount (feeding speed) per unit cycle of a tool when the cutting part of the tool passes through a workpiece may be efficiently performed.

As a first modified example of the machine learning device 100 of the controller 1, the state observation section 102 may further observe, as the state variable S, main-spindle rotation-speed data S3 including the rotation speed of a main spindle (the rotation speed of a tool) when the cutting part of the tool passes through a workpiece. In this case, both a feeding amount (feeding speed) per unit cycle of a tool when the cutting part of the tool passes through a workpiece in crosscut grooving and the rotation speed of a main spindle (the rotation speed of the tool) when the cutting part of the tool passes through the workpiece may be learned in association with the vibration amount data S2.

In the above first modified example, the machine learning device 100 may learn a feeding amount (feeding speed) per unit cycle of a tool and the rotation speed of a main spindle (the rotation speed of the tool) when the cutting part of the tool passes through a workpiece in crosscut grooving with respect to a vibration amount of the cutting part of the tool when the cutting part of the tool passes through the workpiece in the crosscut grooving. Thus, when the cutting part of a tool indicates a certain vibration amount when passing through a workpiece in crosscut grooving, the vibration amount may be reduced more appropriately by changing both a feeding amount (feeding speed) per unit cycle of the tool and the rotation speed of a main spindle (the rotation speed of the tool) when the cutting part of the tool passes through the workpiece in the crosscut grooving with respect to the state to appropriate values.

As a second modified example of the machine learning device 100 of the controller 1, the state observation section 102 may further observe, as the state variables S, tool data S4 including information such as a type, a shape, and material (rigidity) of a tool, workpiece data S5 including information such as material and hardness of a workpiece, machining shape data S6 including information such as a machining shape of a part where the cutting part of the tool passes through the workpiece, machine data S7 including information such as a model number and rigidity of a machine, and other elements having an influence on a vibration amount of the cutting part of the tool, or the like. In this case, a feeding amount (feeding speed) per unit cycle of a tool when the cutting part of the tool passes through a workpiece in crosscut grooving may be learned in association with at least any of the tool data S4, the workpiece data S5, the machining shape data S6, and the machine data S7, besides the vibration amount data S2.

According to the above second modified example, the machine learning device 100 may learn, besides a vibration amount of the cutting part of a tool when the cutting part of the tool passes through a workpiece in a crosscut grooving, a feeding amount (feeding speed) per unit cycle of the tool when the cutting part of the tool passes through the workpiece in the crosscut grooving with respect to elements having an influence on the vibration amount of the cutting part of the tool such as a type, a shape, and material (rigidity)

of the tool, a material, hardness, and a machining shape of the workpiece, and a model type and rigidity of a machine.

As a third modified example of the machine learning device 100 of the controller 1, the determination data acquisition section 104 may use, as the determination data D, evaluation values D2 of cycle time for crosscut grooving, besides the propriety determination values D1 with respect to a vibration amount of the cutting part of a tool when the cutting part of the tool passes through a workpiece in the crosscut grooving.

According to the above third modified example, the machine learning device 100 may consider cycle time for crosscut grooving in the learning of a feeding amount (feeding speed) per unit cycle of a tool when the cutting part of the tool passes through a workpiece, with respect to a vibration amount of the cutting part of the tool when the cutting part of the tool passes through the workpiece in the crosscut grooving.

As a fourth modified example of the machine learning device 100 of the controller 1, the learning section 106 may learn a feeding amount (feeding speed) per unit cycle of a tool when the cutting part of the tool passes through a workpiece in crosscut grooving in a plurality of machine tools, using the state variables S and the determination data D obtained for each of the plurality of machine tools that performs the same crosscut grooving.

According to the above fourth modified example, it is possible to increase an amount of a data set including the state variables S and the determination data D acquired in a certain period of time. Therefore, the speed and the reliability of learning a feeding amount (feeding speed) per unit cycle of a tool when the cutting part of the tool passes through a workpiece in crosscut grooving may be improved with a set of more various data as inputs.

In the machine learning device 100 having the above configuration, a learning algorithm performed by the learning section 106 is not particularly limited, and a learning algorithm known as machine learning may be employed for the machine learning.

Figure 3:
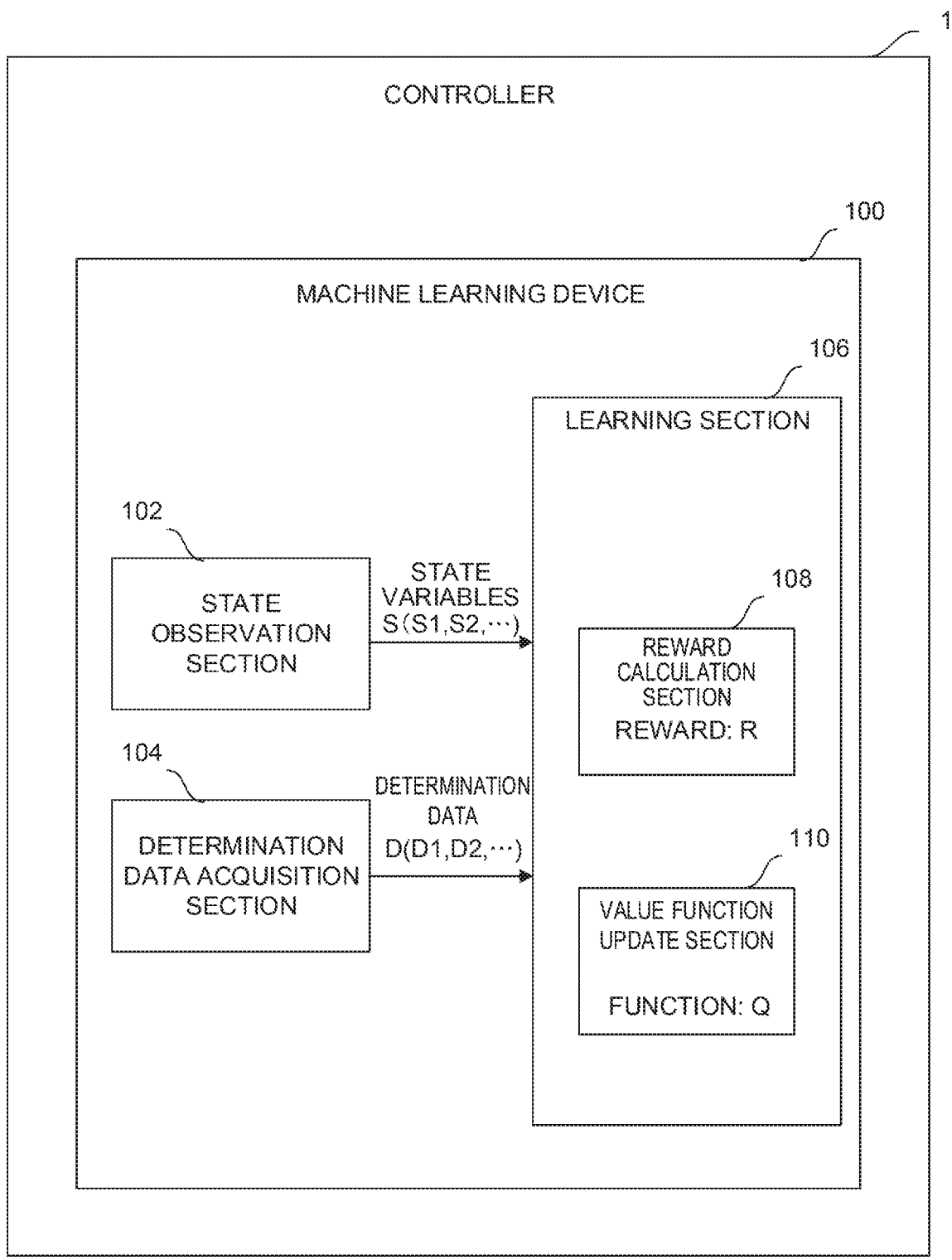
FIG. 3 is a schematic function block diagram showing an embodiment of the controller shown in FIG. 1.

FIG. 3 shows, as an embodiment of the controller 1 shown in FIG. 1, a configuration including the learning section 106 that performs reinforcement learning as an example of a learning algorithm.

The reinforcement learning is a method in which, while the current state (that is, an input) of an environment in which a learning target exists is observed, a prescribed action (that is, an output) is performed in the current state and the cycle of giving any reward to the action is repeatedly performed by trial and error to learn measures (a feeding amount (feeding speed) per unit cycle of a tool when the cutting part of the tool passes through a workpiece in crosscut grooving in the machine learning device of the present application) to maximize the total of the rewards, as an optimum solution.

In the machine learning device 100 of the controller 1 shown in FIG. 3, the learning section 106 includes a reward calculation section 108 that calculates a reward R relating to a propriety determination result (corresponding to the determination data D used in the next learning cycle in which the state variables S have been acquired) of a vibration amount of the cutting part of a tool when the cutting part of the tool passes through a workpiece in crosscut grooving based on the state variables S, and includes a value function update section 110 that updates, using the calculated rewards R, a function Q that expresses a value of a feeding amount (feeding speed) per unit cycle of the tool when the cutting part of the tool passes through the workpiece. The learning section 106 learns a feeding amount (feeding speed) per unit cycle of a tool when the cutting part of the tool passes through a workpiece, with respect to a vibration amount of the cutting part of the tool when the cutting part of the tool passes through the workpiece in crosscut grooving in such a way that the value function update section 110 repeatedly updates the function Q.

An example of a reinforcement learning algorithm performed by the learning section 106 will be described. The algorithm in this example is known as Q-learning and expresses a method in which a state s of an action subject and an action a possibly taken by the action subject in the state s are assumed as independent variables and a function Q(s, a) that expresses an action value when the action a is selected in the state s is learned. The selection of the action a by which the value function Q becomes maximum in the state s results in an optimum solution. By starting the Q-learning in a state in which the correlation between the state s and the action a is unknown and repeatedly performing the selection of various actions a by trial and error in any state s, the value function Q is repeatedly updated to be approximated to an optimum solution. Here, when an environment (that is, the state s) changes as the action a is selected in the state s, a reward (that is, weighting of the action a) r is obtained according to the change and the learning is directed to select an action a by which a higher reward r is obtained. Thus, the value function Q may be approximated to an optimum solution in a relatively short period of time.

Generally, the update formula of the value function Q may be expressed like the following formula (1). In formula (1), $s_t$ and $a_t$ express a state and an action at time t, respectively, and the state changes to $s_{t+1}$ with the action $a_t$. $r_{t+1}$ expresses a reward obtained when the state changes from $s_t$ to $s_{t+1}$. The term of maxQ expresses Q in a case in which an action a by which the value function Q becomes maximum at time t+1 (which is assumed at time t) is performed. $\alpha$ and $\gamma$ express a learning coefficient and a discount rate, respectively, and arbitrarily set to fall within $0<\alpha\le 1$ and $0<\gamma\le 1$, respectively.

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

When the learning section 106 performs the Q-learning, the state variables S observed by the state observation section 102 and the determination data D acquired by the determination data acquisition section 104 correspond to the state s in the update formula (formula (1)), the action of changing a feeding amount (feeding speed) per unit cycle of a tool when the cutting part of the tool passes through a workpiece, with respect to a current state (that is, a vibration amount of the cutting part of the tool when the cutting part of the tool passes through the workpiece in crosscut grooving) corresponds to the action a in the update formula, and the rewards R calculated by the reward calculation section 108 correspond to the reward r in the update formula.

Accordingly, the value function update section 110 repeatedly updates the function Q that expresses a feeding amount (feeding speed) per unit cycle of a tool when the cutting part of the tool passes through a workpiece, with respect to a current state (a vibration amount of the cutting part of the tool when the cutting part of the tool passes through the workpiece) by the Q-learning using the rewards R.

After determination of a feeding amount (feeding speed) per unit cycle of a tool when the cutting part of the tool passes through a workpiece, when the crosscut grooving is performed based on the determined feeding amount (feeding speed) per unit cycle of the tool, (i) the reward R calculated by the reward calculation section 108 may be positive, for example, if a propriety determination result of a vibration amount of the cutting part of a tool when the cutting part of the tool passes through a workpiece in crosscut grooving is determined to be "appropriate" (for example, a case in which a vibration amount of the cutting part of the tool when the cutting part of the tool passes through the workpiece falls within an allowable range, a case in which cycle time for the crosscut grooving falls within an allowable range, or the like), (ii) on the other hand, the reward R calculated by the reward calculation section 108 may be negative, for example, if a propriety determination result of a vibration amount of the cutting part of a tool when the cutting part of the tool passes through a workpiece in crosscut grooving is determined to be "inappropriate" (for example, a case in which a vibration amount of the cutting part of the tool when the cutting part of the tool passes through the workpiece goes beyond an allowable range, a case in which cycle time for the crosscut grooving goes beyond an allowable range, or the like).

The absolute values of the positive and negative rewards R may be the same or different from each other. In addition, as determination conditions, a plurality of values included in the determination data D may be combined together to perform a determination.

In addition, a propriety determination result of a vibration amount of the cutting part of a tool when the cutting part of the tool passes through a workpiece in crosscut grooving may include not only two levels of "appropriate" and "inappropriate" results but also a plurality of levels of results. As an example, when a maximum value within an allowable range as a vibration amount of the cutting part of a tool is assumed as $V_{max}$, the reward R=5 is given if a vibration amount V of the cutting part of the tool falls within $0 \leq V < V_{max}/5$, the reward R=2 is given if the vibration amount V falls within $V_{max}/5 \leq V < V_{max}/2$, and the reward R=1 is given if the vibration amount V falls within $V_{max}/2 \leq V \leq V_{max}$. In addition, $V_{max}$ may be set to be relatively larger at the initial stage of the learning and set to decrease as the learning is advanced.

The value function update section 110 may have an action value table in which the state variables S, the determination data D, and the rewards R are organized in association with action values (for example, numeric values) expressed by the function Q. In this case, the action of updating the function Q with the value function update section 110 is equivalent to the action of updating the action value table with the value function update section 110. At the start of the Q-learning, the correlation between the current state of an environment and a feeding amount (feeding speed) per unit cycle of a tool when the cutting part of the tool passes through a workpiece is unknown. Therefore, in the action value table, various kinds of the state variables S, the determination data D, and the rewards R are prepared in association with values (function Q) of randomly-set action values. Note that the reward calculation section 108 may immediately calculate the rewards R corresponding to the determination data D when the determination data D is known, and values of the calculated rewards R are written in the action value table.

When the Q-learning is advanced using the reward R corresponding to a propriety determination result of a vibration amount of the cutting part of a tool when the cutting part of the tool passes through a workpiece in crosscut grooving, the learning is directed to select the action of obtaining a higher reward R. Then, values (function Q) of action values for an action performed in a current state are rewritten to update the action value table according to the state of an environment (that is, the state variables S and the determination data D) that changes as the selected action is performed in the current state. By repeatedly performing the update, values (function Q) of action values displayed in the action value table are rewritten to be larger as an action is more appropriate. Thus, the correlation between a current state (a vibration amount of the cutting part of a tool when the cutting part of the tool passes through a workpiece in crosscut grooving) in an unknown environment and a corresponding action (a feeding amount (feeding speed) per unit cycle of the tool when the cutting part of the tool passes through the workpiece) becomes gradually obvious. That is, by the update of the action value table, the relationship between a vibration amount of the cutting part of a tool when the cutting part of the tool passes through a workpiece in crosscut grooving and a feeding amount (feeding speed) per unit cycle of the tool when the cutting part of the tool passes through the workpiece is gradually approximated to an optimum solution.

Figure 4:
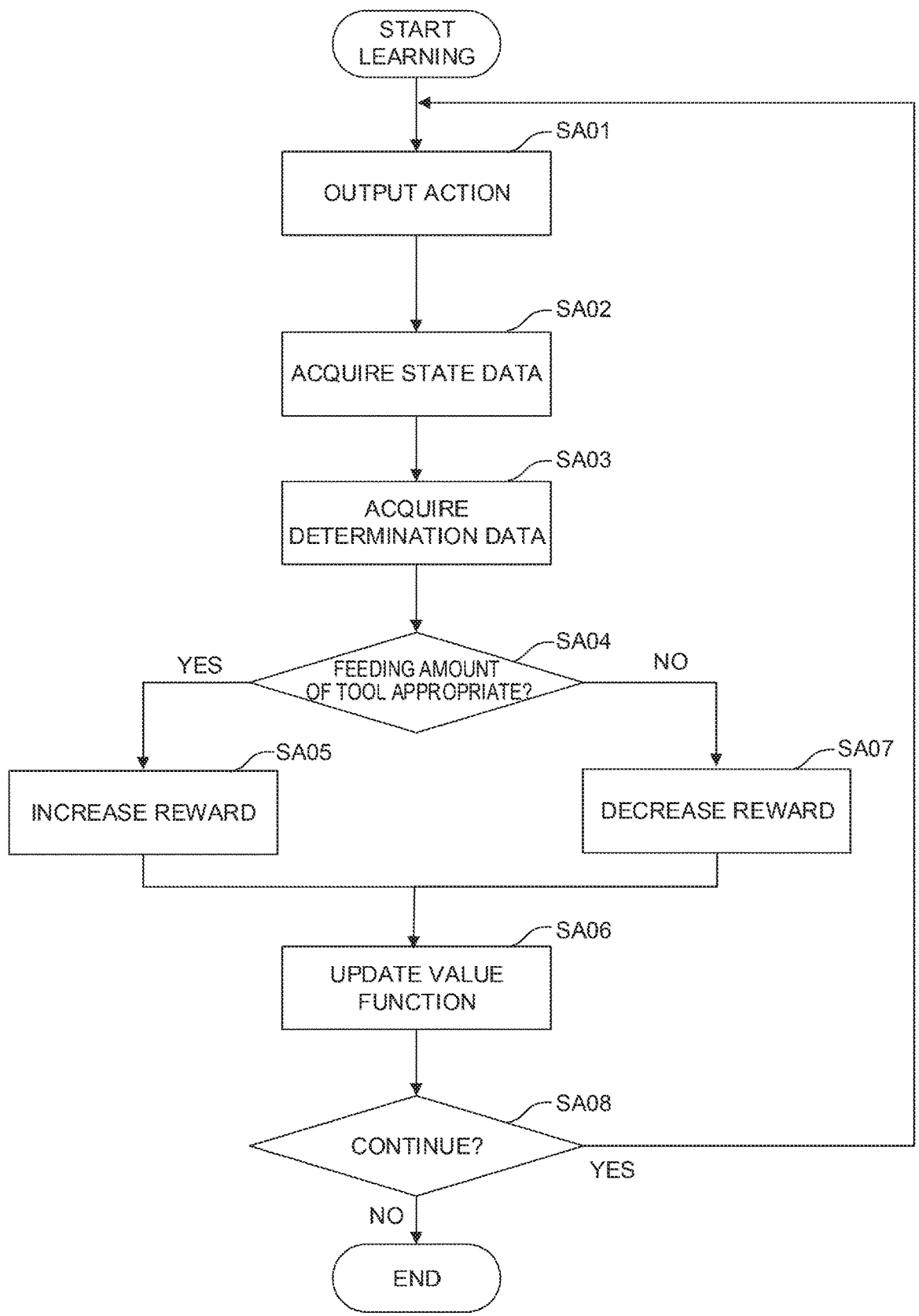
FIG. 4 is a schematic flowchart showing an embodiment of a machine learning method.

The flow of the above Q-learning (that is, an embodiment of a machine learning method) performed by the learning section 106 will be further described with reference to the flowchart of FIG. 4.

First, in step SA01, the value function update section 110 randomly selects, by referring to an action value table at that time, a feeding amount (feeding speed) per unit cycle of a tool when the cutting part of the tool passes through a workpiece as an action performed in a current state indicated by the state variables S observed by the state observation section 102.

Next, the value function update section 110 imports the state variable S in the current state observed by the state observation section 102 in step SA02, and imports the determination data D in the current state acquired by the determination data acquisition section 104 in step SA03. Then, in step SA04, the value function update section 110 determines if the feeding amount (feeding speed) per unit cycle of the tool when the cutting part of the tool passes through the workpiece is appropriate based on the determination data D. If the feeding amount is appropriate, the value function update section 110 applies a positive reward R calculated by the reward calculation section 108 to the update formula of the function Q in step SA05. Next, in step SA06, the value function update section 110 updates the action value table using the state variable S and the determination data D in the current state, the reward R, and a value (updated function Q) of an action value. If it is determined in step SA04 that the feeding amount (feeding speed) per unit cycle of the tool when the cutting part of the tool passes through the workpiece is inappropriate, the value function update section 110 applies a negative reward R calculated by the reward calculation section 108 to the update formula of the function Q in step SA07. Then, in step SA06, the value function update section 110 updates the action value table using the state variable S and the determination data D in the current state, the reward R, and the value (updated function Q) of the action value.

The learning section 106 updates the action value table over again by repeatedly performing the above processing of steps SA01 to SA07 and advances the learning of the feeding amount (feeding speed) per unit cycle of the tool when the cutting part of the tool passes through the workpiece. Note that the processing of calculating the rewards R and the processing of updating the value function in steps SA04 to SA07 are performed for each of data contained in the determination data D.

Figure 5A:
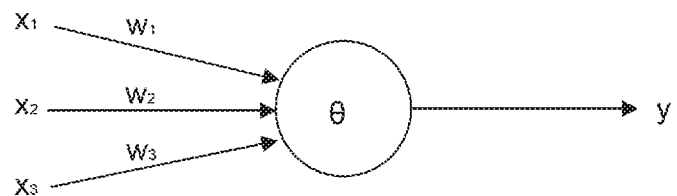
FIG. 5A is a diagram for describing a neuron.
Figure 5B:
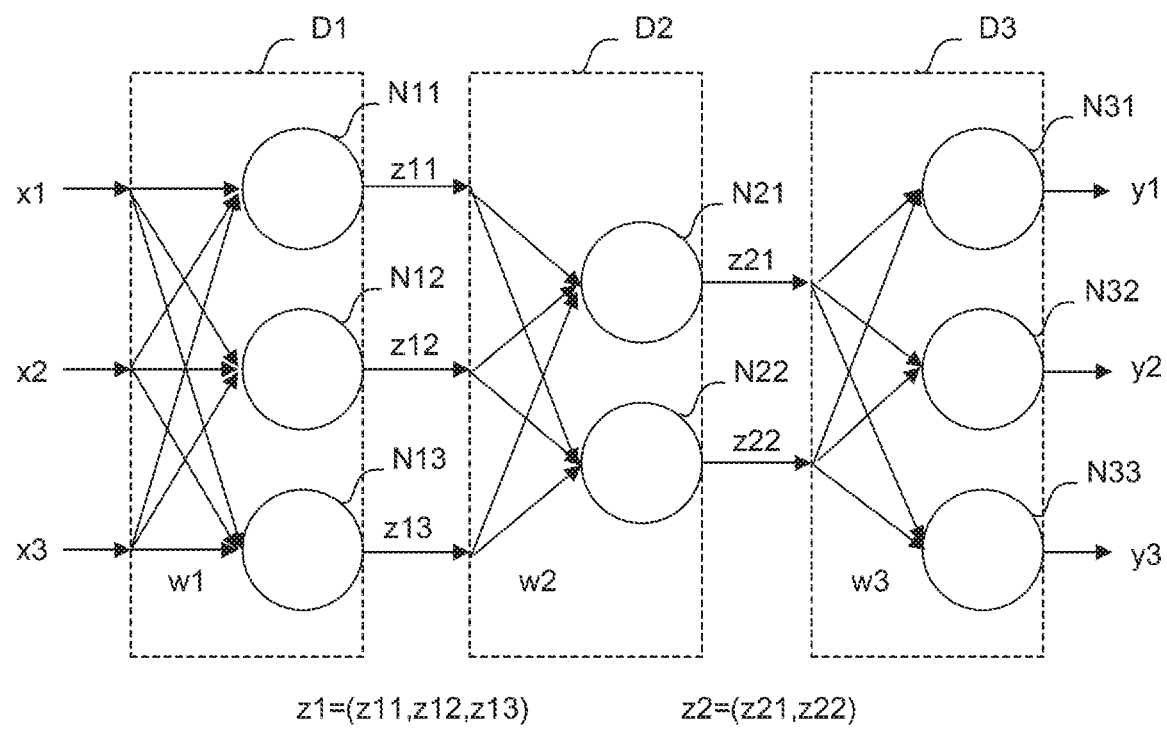
FIG. 5B is a diagram for describing a neural network.

In advancing the above reinforcement learning, a neural network may be used instead of, for example, the Q-learning. FIG. 5A schematically shows a neuron model. FIG. 5B schematically shows the model of a neural network having three layers in which the neurons shown in FIG. 5A are combined together. The neural network may be configured by, for example, a calculation unit, a storage unit, or the like following a neuron model.

The neuron shown in FIG. 5A outputs a result y with respect to a plurality of inputs x (here, inputs $x_1$ to $x_3$ as an example). The inputs $x_1$ to $x_3$ are multiplied by corresponding weights w ($w_1$ to $w_3$), respectively. Thus, the neuron outputs the result y expressed by the following formula (2). Note that in the following formula (2), an input x, a result y, and a weight w are all vectors. In addition, θ expresses a bias, and $f_k$ expresses an activation function.

$$y = f_k(\Sigma_{i=1}^{n} x_i w_i - \theta) \quad (2)$$

In the neural network having the three layers shown in FIG. 5B, a plurality of inputs x (here, inputs x1 to x3 as an example) is input from the left side of the neural network, and results y (here, results y1 to y3 as an example) are output from the right side of the neural network. In the example shown in FIG. 5B, the inputs x1 to x3 are multiplied by corresponding weights (collectively expressed as w1) and input to three neurons N11 to N13, respectively.

In FIG. 5B, the respective outputs of the neurons N11 to N13 are collectively expressed as z1. The outputs z1 may be regarded as feature vectors obtained by extracting feature amounts of the input vectors. In the example shown in FIG. 5B, the respective feature vectors z1 are multiplied by corresponding weights (collectively indicated as w2) and input to two neurons N21 and N22, respectively. The feature vectors z1 express the features between the weights w1 and the weights w2.

In FIG. 5B, the respective outputs of neurons N21 and N22 are collectively expressed as z2. The outputs z2 may be regarded as feature vectors obtained by extracting feature amounts of the feature vectors z1. In the example shown in FIG. 5B, the respective feature vectors z2 are multiplied by corresponding weights (collectively indicated as w3) and input to three neurons N31 to N33, respectively. The feature vectors z2 express the features between the weights w2 and the weight w3. Finally, the neurons N31 to N33 output the results y1 to y3, respectively.

Note that it is possible to employ so-called deep learning in which a neural network forming three or more layers is used.

In the machine learning device 100 of the controller 1, the learning section 106 performs the calculation of the state variables S and the determination data D as inputs x in a multilayer structure according to the above neural network to be capable of outputting the function Q (result y) that expresses an action value. Note that the action mode of the neural network includes a learning mode and a value prediction mode. For example, it is possible to learn a weight w using a learning data set in the learning mode and determine an action value using the learned weight w in the value prediction mode. Note that detection, classification, deduction, or the like may be performed in the value prediction mode.

The configuration of the above controller 1 may be described as a machine learning method (or software) performed by the CPU of a computer. The machine learning method is a method for learning a feeding amount (feeding speed) per unit cycle of a tool when the cutting part of the tool passes through a workpiece in crosscut grooving. The CPU of a computer performs:

a step of observing feeding amount data S1 indicating a feeding amount (feeding speed) per unit cycle of a tool when the cutting part of the tool passes through a workpiece, and vibration amount data S2 indicating a vibration amount of the cutting part of the tool when the cutting part of the tool passes through the workpiece, as state variables S that express the current state of an environment in which crosscut grooving is performed;

a step of acquiring determination data D indicating a propriety determination result of the vibration amount of the cutting part of the tool when the cutting part of the tool passes through the workpiece; and a step of learning the vibration amount data S2 and the feeding amount (feeding speed) per unit cycle of the tool when the cutting part of the tool passes through the workpiece in a manner such that they are correlated each other, using the state variables S and the determination data D.

Figure 6:
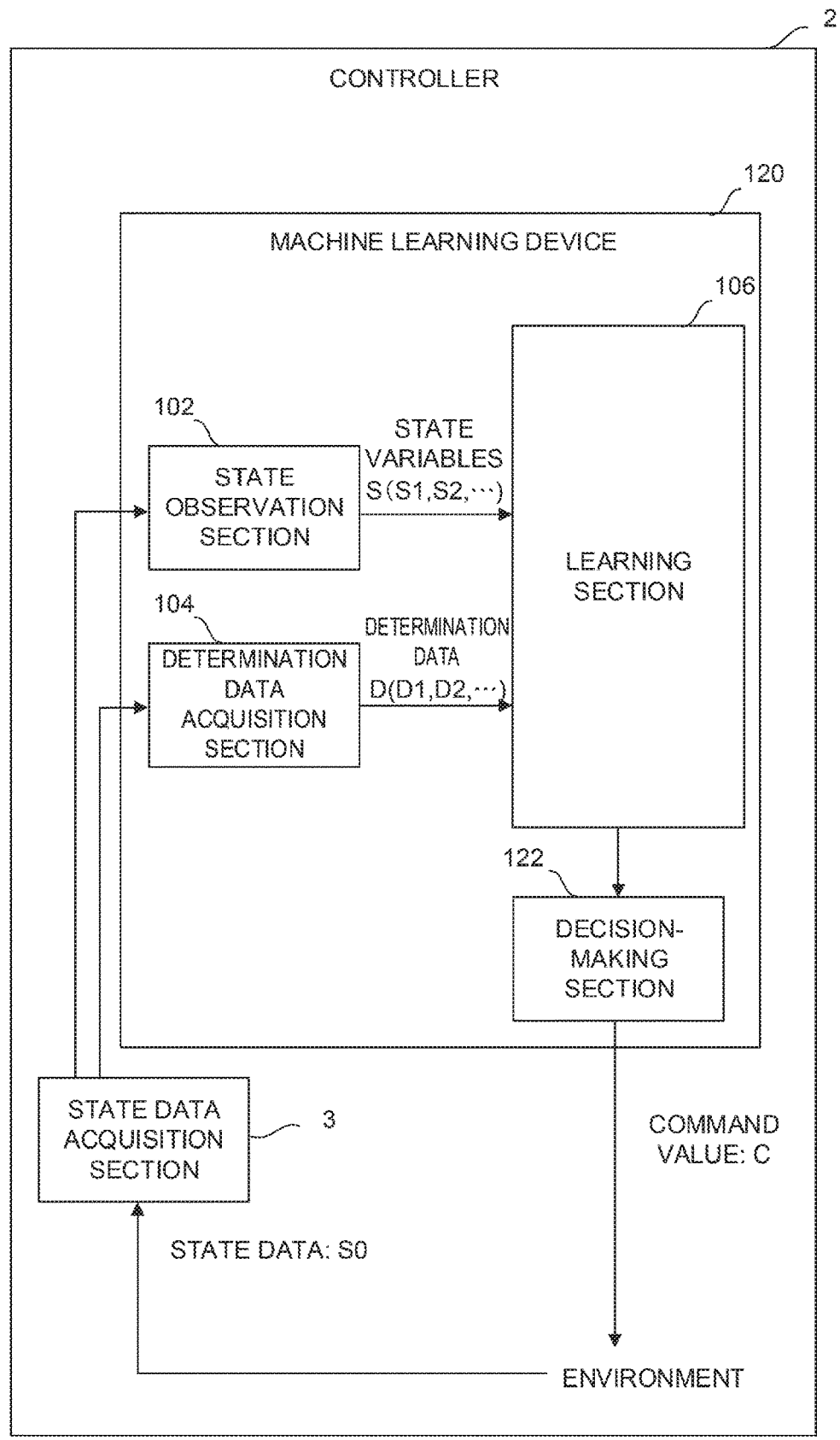
FIG. 6 is a schematic function block diagram of a controller according to a second embodiment of the present invention.

FIG. 6 shows a controller 2 according to a second embodiment.

The controller 2 of the embodiment includes a machine learning device 120 and a state data acquisition section 3. The state data acquisition section 3 acquires feeding amount data S1 and vibration amount data S2 of state variables S observed by a state observation section 102 as state data S0. The state data S0 acquired by the state data acquisition section 3 may also include main-spindle rotation-speed data S3, tool data S4, workpiece data S5, machining shape data S6, machine data S7, or the like. The state data acquisition section 3 may acquire the state data S0 from the respective sections of the controller 2, various sensors of a machine tool, appropriate data inputs by a worker, or the like.

The machine learning device 120 of the controller 2 includes, besides software (such as a learning algorithm) and hardware (such as the CPU of a computer) for spontaneously learning a feeding amount (feeding speed) per unit cycle of a tool when the cutting part of the tool passes through a workpiece in crosscut grooving through machine learning, software (such as a calculation algorithm) and hardware (such as the CPU of a computer) for outputting the learned feeding amount (feeding speed) per unit cycle of the tool when the cutting part of the tool passes through the workpiece in the crosscut grooving as a command for the controller 2. The machine learning device 120 of the controller 2 may be so configured that one common CPU performs all software such as a learning algorithm and a calculation algorithm.

A decision-making section 122 may be configured as, for example, one of the functions of the CPU of a computer or software for functioning the CPU of the computer. The decision-making section 122 generates and outputs a command value C including a command for determining a feeding amount (feeding speed) per unit cycle of a tool when the cutting part of the tool passes through a workpiece, with respect to a vibration amount of the cutting part of the tool when the cutting part of the tool passes through the workpiece in crosscut grooving, based on learning results of the learning section 106. When the decision-making section 122 outputs the command value C to the controller 2, the state of an environment changes correspondingly. Note that the decision-making section 122 may include, as the command value C, a command for determining the rotation speed of a main spindle when the cutting part of a tool passes through a workpiece (the rotation speed of the tool), besides a command for determining a feeding amount (feeding speed) per unit cycle of the tool when the cutting part of the tool passes through the workpiece.

The state observation section 102 observes, in a next learning cycle, state variables S changed after the output of the command value C to an environment by the decision-making section 122. The learning section 106 updates, for example, a value function Q (i.e. an action value table) using the changed state variables S to learn a feeding amount (feeding speed) per unit cycle of a tool when the cutting part of the tool passes through a workpiece. Note that the state observation section 102 may observe the feeding amount data S1 from the internal memory of the machine learning device 120 as described in the first embodiment, instead of acquiring the same from the state data S0 acquired by the state data acquisition section 3.

Based on a learned feeding amount (feeding speed) per unit cycle of a tool when the cutting part of the tool passes through a workpiece, the decision-making section 122 outputs the command value C to the controller 2 according to state variables S.

By repeatedly performing the learning cycle, the machine learning device 120 advances the learning of a feeding amount (feeding speed) per unit cycle of a tool when the cutting part of the tool passes through a workpiece and gradually improves the reliability of the feeding amount (feeding speed) per unit cycle of the tool when the cutting part of the tool passes through the workpiece, determined by the machine learning device 120 itself.

The machine learning device 120 of the controller 2 having the above configuration produces the same effect as that of the above machine learning device 100 described above with reference to FIGS. 2 and 3. Particularly, the machine learning device 120 shown in FIG. 6 may change the state of an environment with the output of the decision-making section 122. On the other hand, the machine learning device 100 shown in FIGS. 2 and 3 may ask a function corresponding to a decision-making section for reflecting learning results of the learning section 106 on an environment for an external apparatus.

Figure 7:
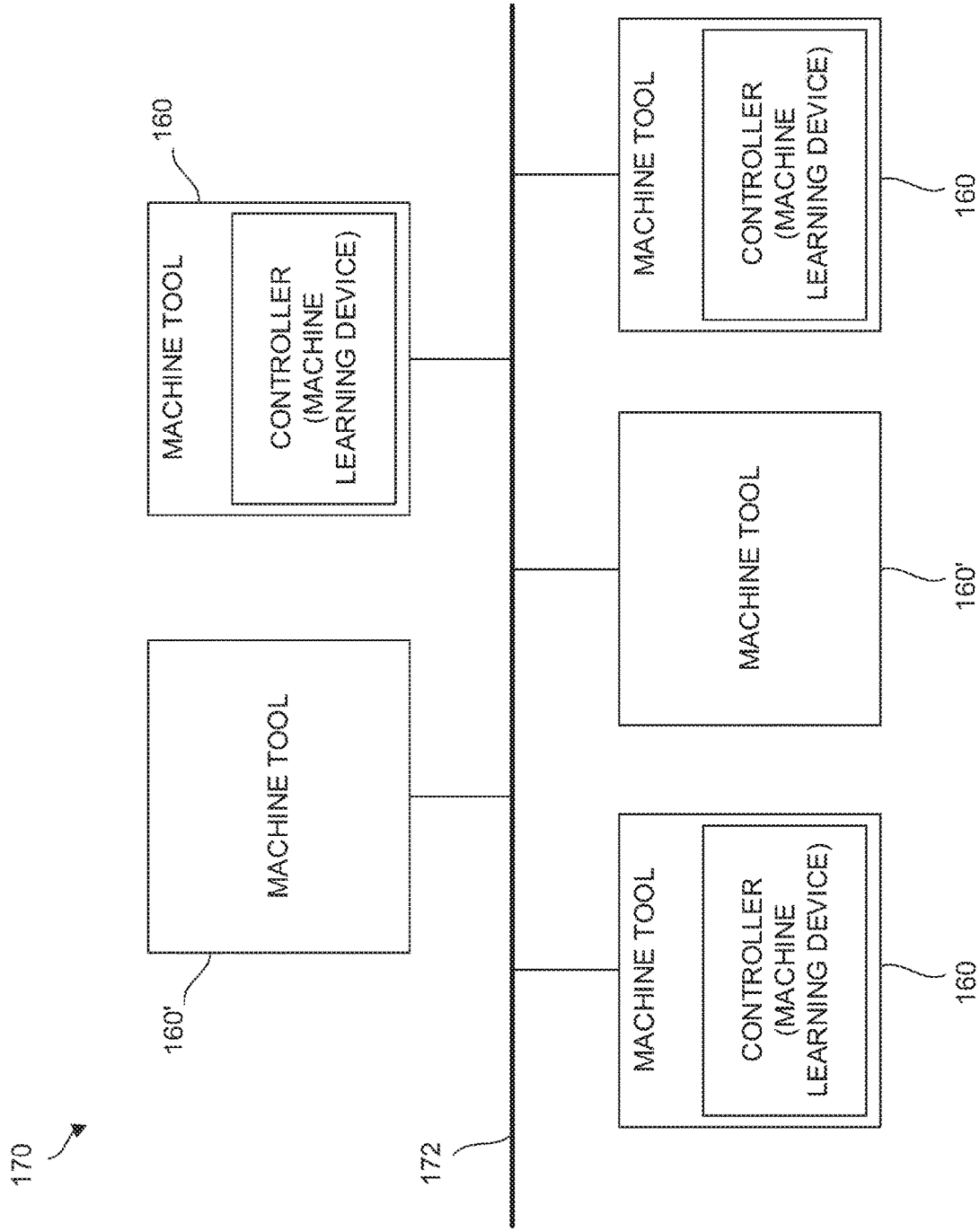
FIG. 7 is a schematic function block diagram showing an embodiment of a system including controllers.

FIG. 7 shows a system 170 including a plurality of machine tools according to an embodiment.

The system 170 includes a plurality of machine tools 160 and 160' having at least the same machine configuration and a wired/wireless network 172 that connects the machine tools 160 and 160' to each other. At least one of the plurality of machine tools is configured as a machine tool 160 including the above controller 2. In addition, the system 170 may have machine tools 160' that do not include the controller 2. The machine tools 160 and 160' have a mechanism that is configured for the same purpose and aims to perform crosscut grooving.

In the system 170 having the above configuration, the machine tools 160 including the controller 2 among the plurality of machine tools 160 and 160' may automatically and accurately calculate a feeding amount (feeding speed) per unit cycle of a tool when the cutting part of the tool passes through a workpiece, with respect to a vibration amount of the cutting part of the tool when the cutting part of the tool passes through the workpiece in crosscut grooving, without relying on calculation or estimation using learning results of the learning section 106. In addition, the controller 2 of at least one of the machine tools 160 may learn a feeding amount (feeding speed) per unit cycle of a tool when the cutting part of the tool common to all the machine tools 160 and 160' passes through a workpiece based on state variables S and determination data D obtained for each of the other plurality of machine tools 160 and 160' so that the learning results are shared between all the machine tools 160 and 160'.

Accordingly, the system 170 makes it possible to improve the speed and the reliability of learning a feeding amount (feeding speed) per unit cycle of a tool when the cutting part of the tool passes through a workpiece, with a broader range of data sets (including state variables S and determination data D) as inputs.

Figure 8:
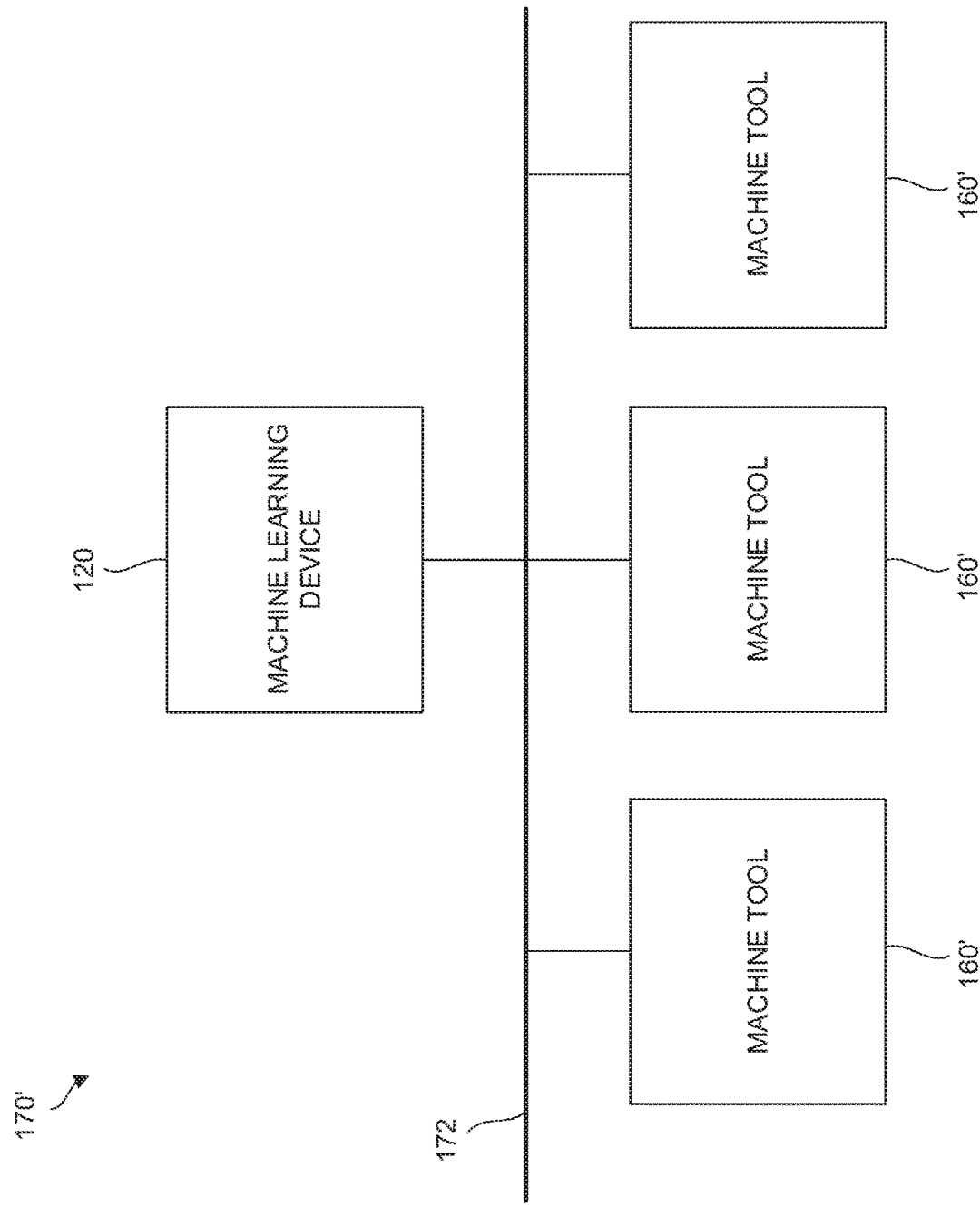
FIG. 8 is a schematic function block diagram showing another embodiment of a system including a controller.
Figure 9:
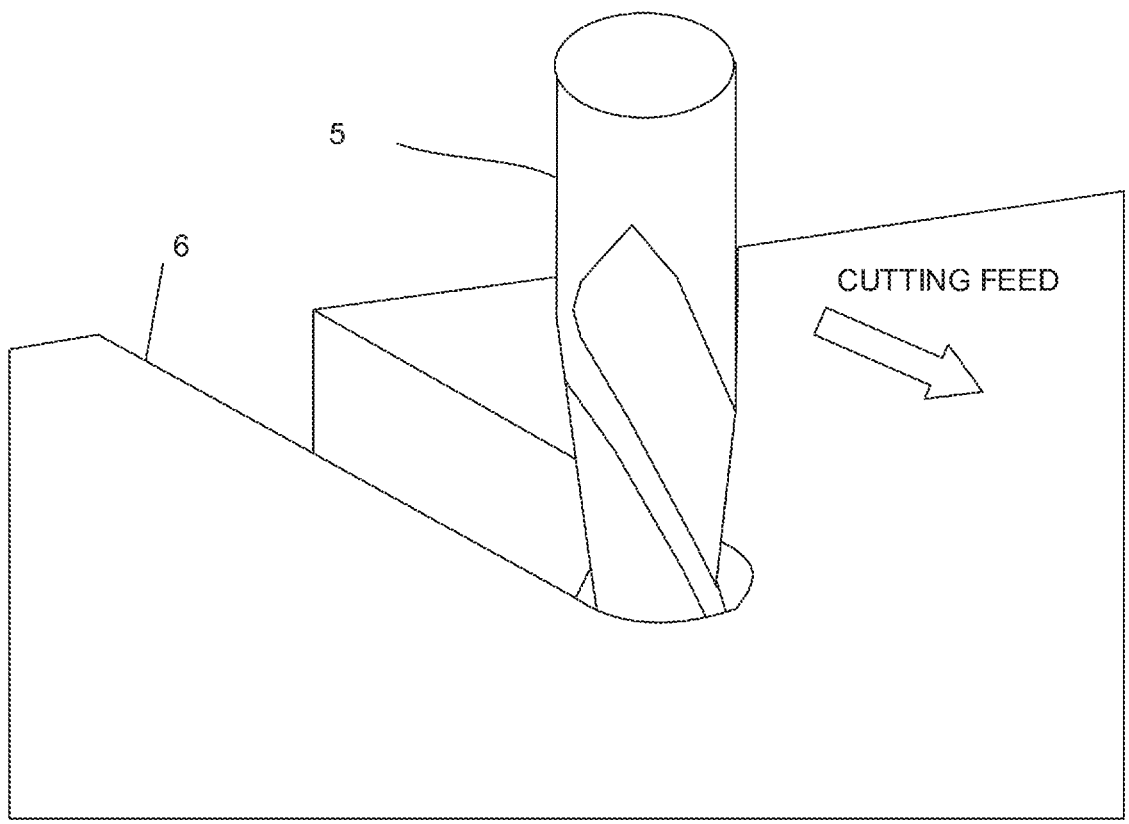
FIG. 9 is a diagram showing an example of crosscut grooving according to a related art.
Figure 10A:
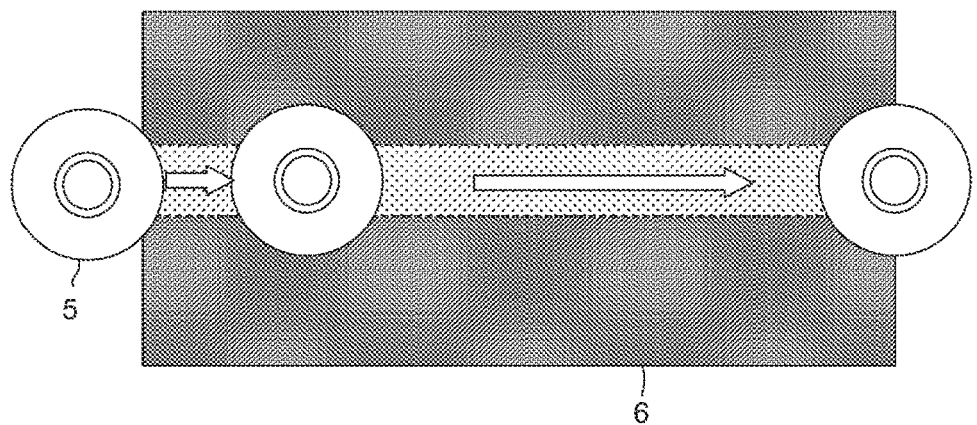
FIGS. 10A and 10B are diagrams for describing problems in the crosscut grooving according to the related art.
Figure 10B:
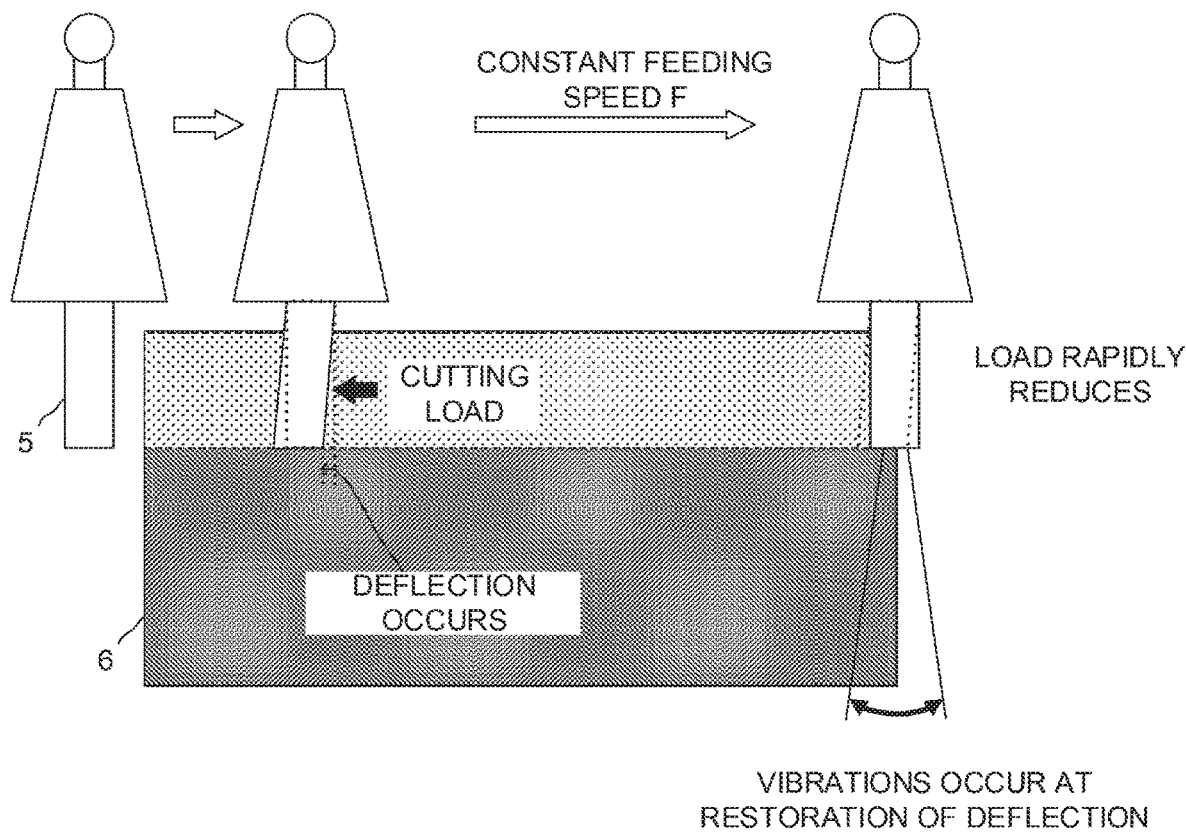

FIG. 8 shows a system 170' including a plurality of machine tools 160' according to another embodiment.

The system 170' includes the machine learning device 120 (or 100), the plurality of machine tools 160' having the same machine configuration (the machine tools not including the controller), and a wired/wireless network 172 that connects the machine tools 160' and the machine learning device 120 (or 100) to each other.

In the system 170' having the above configuration, the machine learning device 120 (or 100) may learn a feeding amount (feeding speed) per unit cycle of a tool when the cutting part of the tool passes through a workpiece, with respect to a vibration amount of the cutting part of the tool when the cutting part of the tool passes through the workpiece in crosscut grooving common to all the machine tools 160', based on state variables S and determination data D obtained for each of the plurality of machine tools 160', and automatically and accurately calculate the feeding amount (feeding speed) per unit cycle of the tool when the cutting part of the tool passes through the workpiece, with respect to the vibration amount of the cutting part of the tool when the cutting part of the tool passes through the workpiece in the crosscut grooving, using the learning results without relying on calculation or estimation.

In the system 170', the machine learning device 120 (or 100) may have a configuration existing in a cloud server or the like provided in the wired/wireless network 172. According to the configuration, a desired number of the machine tools 160' may be connected to the machine learning device 120 (or 100) where necessary regardless of the existing locations and the times of the plurality of machine tools 160'.

Workers engaging in the systems 170 and 170' may perform a determination as to whether the achievement degree of learning, by the machine learning device 120 (or 100), of a feeding amount (feeding speed) per unit cycle of a tool when the cutting part of the tool passes through a workpiece (in other words, the reliability of the feeding amount (feeding speed) per unit cycle of the tool when the cutting part of the tool passes through the workpiece) has reached a required level at an appropriate timing after the start of learning by the machine learning device 120 (or 100).

The embodiments of the present invention are described above. However, the present invention is not limited to the examples of the above embodiments and may be carried out in various modes with the addition of appropriate modifications.

For example, a learning algorithm performed by the machine learning devices 100 and 120, a calculation algorithm performed by the machine learning device 120, and a control algorithm performed by the controllers 1 and 2 are not limited to the above algorithms, but various algorithms may be employed.

In addition, the above embodiments describe a configuration in which the controller 1 (or 2) and the machine learning device 100 (or 120) have different CPUs. However, the machine learning device 100 (or 120) may be realized by the CPU 11 of the controller 1 (or 2) and a system program stored in the ROM 12.

Moreover, the above embodiments describe a configuration in which the controller 2 controls a feeding amount (feeding speed) per unit cycle of a tool when the cutting part of the tool passes through a workpiece based on the command value C output from the machine learning device 120. However, the command value C output from the machine learning device 120 may be displayed on the display device/ MDI unit 70 of the controller 2 as a reference when a worker generates a machining program.

The invention claimed is:

1. A controller that determines a rotational speed of a tool and a feeding amount per unit cycle of a tool when a cutting part of the tool passes through and exits a workpiece in crosscut grooving, the controller comprising:
    a processor for controlling the tool and performing a machine learning algorithm including:
    controlling, by the processor, a first motor to rotate the tool at the rotational speed, and a second motor to move the cutting part of the tool along an axis to pass through and exit the workpiece at the feeding amount per unit cycle;
    observing, by the processor, state variables that express a current operational state of an environment in which a learning target exists, the state variables including a feeding amount data indicating the feeding amount per unit cycle of the tool when the cutting part of the tool is controlled by the processor to exit the workpiece, and a rotational speed amount data indicating the rotational speed of the tool when the cutting part of the tool is controlled by the processor to exit the workpiece, a tool data indicating information on the tool, machining shape data indicating information on a machining shape, and a vibration amount data indicating a vibration amount of the cutting part of the tool when the cutting part of the tool is controlled by the processor to exit the workpiece;
    acquiring, by the processor, determination data indicating a comparison between:
        i) the vibration amount of the cutting part of the tool due to a current rapid change in the deflection of the tool when the processor controls the first motor and the second motor to rotate and move the cutting part of the tool to exit the workpiece, and
        ii) a previous vibration amount of the cutting part of the tool due to a previous rapid change in the deflection of the tool when the processor previously controlled the first motor and the second motor to rotate and move the cutting part of the tool to make a previous exit from the workpiece;
    computing, by the processor, a reward based on the comparison, the reward being positive when the comparison indicates that the vibration amount decreased as compared to the previous vibration amount, and the reward being negative when the comparison indicates that the vibration amount increased as compared to the previous vibration amount;
    learning, by the processor, based on the state variables, the determination data and the reward, an adjusted rotational speed of the tool and an adjusted feeding amount per unit cycle of the tool which maintains a subsequent vibration due to a subsequent rapid change in the deflection of the tool when the cutting part of the tool exits the workpiece to within an allowable range in association with the tool data, the machining shape data, and the vibration amount data, using the state variables and the determination data;
    controlling, by the processor, the first motor to rotate the tool at the adjusted rotational speed, and the second motor to move the cutting part of the tool along the axis to make a subsequent exit from the workpiece at the adjusted feeding amount per unit cycle; and
    repeating, by the processor, the machine learning algorithm to maximize a total of the rewards to optimize the adjusted rotational speed and the adjusted feeding amount per unit cycle.

2. The controller according to claim 1, wherein
    the state observation section further observes, as the state variable, at least any of workpiece data indicating information on the workpiece, and machine data indicating information on a machine, and
    the learning section learns the data observed by the state observation section in association with the vibration amount data.

3. The controller according to claim 1, wherein
    the determination data includes a propriety determination result of cycle time for the crosscut grooving, besides the propriety determination result of the vibration amount of the cutting part of the tool.

4. The controller according to claim 1, wherein
    the learning section includes
    a reward calculation section that calculates a reward relating to the propriety determination result, and
    a value function update section that updates, using the reward, a function that expresses a value of the feeding amount per unit cycle of the tool when the cutting part of the tool passes through the workpiece, with respect to the tool data, the machining shape data, and the vibration amount of the cutting part of the tool when the cutting part of the tool passes through the workpiece.

5. The controller according to claim 1, wherein
    the learning section calculates the state variables and the determination data in a multilayer structure.

6. The controller according to claim 1, further comprising a decision-making section that outputs a command value based on the feeding amount per unit cycle of the tool when the cutting part of the tool passes through the workpiece, according to a learning result of the learning section.

7. The controller according to claim 6, wherein
    the state observation section further observes main-spindle rotation-speed data indicating the rotation speed of a main spindle as the state variable, and
    the learning section learns the data observed by the state observation section in association with the vibration amount data.

8. The controller according to claim 7, wherein
    the decision-making section outputs a command value based on the rotation speed of the main spindle when the cutting part of the tool passes through the workpiece.

9. The controller according to claim 1, wherein
    the learning section learns the feeding amount per unit cycle of the tool when the cutting part of the tool passes through the workpiece in each of a plurality of machine tools, using the state variables and the determination data obtained for each of the plurality of machine tools.

10. The controller according to claim 1, wherein the machine learning device exists in a cloud server.

11. A system that determines a rotational speed of a tool and a feeding amount per unit cycle of a tool when a cutting part of the tool passes through and exits a workpiece in crosscut grooving, the system comprising:
- a controller including a control processor for controlling movement of the tool for machining the workpiece; and
- a machine learning device including machine learning processor in communication with the control processor, wherein the system is configured to perform a machine learning algorithm including:

observing, by the machine learning processor, state variables received from the control processor when the control processor controls a first motor to rotate the tool at the rotational speed, and a second motor to move the cutting part of the tool along an axis to pass through and exit the workpiece at the feeding amount per unit cycle, the state variables express a current operational state of an environment in which a learning target exists, the state variables including a feeding amount data indicating the feeding amount per unit cycle of the tool when the cutting part of the tool is controlled by the control processor to exit the workpiece, a rotational speed amount data indicating the rotational speed of the tool when the cutting part of the tool is controlled by the control processor to exit the workpiece, a tool data indicating information on the tool, machining shape data indicating information on a machining shape, and a vibration amount data indicating a vibration amount of the cutting part of the tool when the cutting part of the tool is controlled by the control processor to exit the workpiece;

acquiring, by the machine learning processor, determination data indicating a comparison between:
  i) the vibration amount of the cutting part of the tool due to a current rapid change in the deflection of the tool when the control processor controls the first motor and the second motor to rotate and move the cutting part of the tool to exit the workpiece, and
  ii) a previous vibration amount of the cutting part of the tool due to a previous rapid change in the deflection of the tool when the control processor previously controlled the first motor and the second motor to rotate and move the cutting part of the tool to make a previous exit from the workpiece;

computing, by the machine learning processor, a reward based on the comparison, the reward being positive when the comparison indicates that the vibration amount decreased as compared to the previous vibration amount, and the reward being negative when the comparison indicates that the vibration amount increased as compared to the previous vibration amount;

learning, by the machine learning processor, based on the state variables, the determination data and the reward, an adjusted rotational speed of the tool and an adjusted feeding amount per unit cycle of the tool which maintains a subsequent vibration due to a subsequent rapid change in the deflection of the tool when the cutting part of the tool is controlled by the control processor to exit the workpiece to within an allowable range in association with the tool data, the machining shape data, and the vibration amount data, using the state variables and the determination data;

controlling, by the control processor, the first motor to rotate the tool at the adjusted rotational speed, and the second motor to move the cutting part of the tool along the axis to make a subsequent exit from the workpiece at the adjusted feeding amount per unit cycle; and repeating, by the machine learning processor, the machine learning algorithm to maximize a total of the rewards to optimize the adjusted rotational speed and the adjusted feeding amount per unit cycle.

* * * * *